INVENTORS
Joseph R. Nocera &
David G. Berkowitz

United States Patent Office 3,487,295
Patented Dec. 30, 1969

1

3,487,295
STATIC BATTERY MONITOR AND VOLTAGE
REFERENCE LEVEL SWITCH THEREFOR
Joseph R. Nocera and David G. Berkowitz, Lima, Ohio, assignors to Westinghouse Electric Corporation, Pittsburgh, Pa., a corporation of Pennsylvania
Filed Jan. 8, 1968, Ser. No. 696,216
Int. Cl. G01r 11/44
U.S. Cl. 324—29.5                    5 Claims

ABSTRACT OF THE DISCLOSURE

A circuit for statically monitoring the voltage on a plurality of serially connected, or parallel strings of serially connected, battery cells, and for statically changing the voltage reference levels in the circuit while simultaneously metering cell voltages from the different reference levels. The voltage monitoring is accomplished by transistor switching and diode circuits connected between a common reference voltage source and each individual cell, and a voltmeter permanently connected between the diodes. By turning off the two transistors in the two switching circuits connected respectively on each side of a cell of interest, the voltmeter is placed across the cell through the diodes associated with the two transistors to indicate the voltage of that cell.

The change in voltage reference level is accomplished by first connecting the emitters of the transistors connected to the higher voltage portion of the battery to a point along the cells to provide a second, increased reference voltage which decreases the collector to emitter voltage differential for the transistors in the higher portion of the battery. The voltmeter is then connected to the first reference voltage source through a single transistor and across the transistor switching circuits. To monitor the lower voltage portion of the cells, the single transistor is turned on; to monitor the higher voltage portion the transistor is turned off. A single diode is connected between the transistor and the voltage reference point on the cells to complete the circuit for high voltage monitoring and to block current drain on the cells during low voltage monitoring.

BACKGROUND OF THE INVENTION

The present invention relates generally to battery monitoring circuits and particularly to a reliable, simple and inexpensive circuit for statically measuring cell voltages in a serially connected battery cell arrangement. The invention includes further a simple and inexpensive circuit for changing voltage reference levels.

There is an increasing dependence upon electric power in both private industry and in governmental operations, and there are many critical applications in industry and government where power interruption cannot be tolerated. In such cases, some form of standby and backup service must be provided. For these reasons, battery power is employed with inverter units to provide the necessary alternating current power. The batteries employed usually include many cells serially connected to provide a proper voltage level. To insure the availability of the backup service provided by the battery cells, cell voltage monitoring arrangements or systems are employed to detect individual cell failure.

Presently, battery monitoring arrangements generally employ mechanical relays or switches for selecting and isolating a cell or cells for voltage measuring. Because the selecting and isolating means are mechanical, the reliability of such monitoring arrangements leave much to be desired. A more reliable system would employ semiconductor devices connected in such a manner to allow

2 static switching, i.e., electronic scanning of the cells without the use of mechanical switching devices for connecting the cell of interest to a voltage indicating means.

An inherent characteristic of semiconductors, however, is their inability to isolate input and output signals. Semiconductors further have threshold voltages which are considerably higher than the cell voltages to be sensed. Thus, a method of isolating and static scanning battery cells with semiconductors is not obvious.

Another problem with semiconductors such as transistors is their limited rated and derated collector to emitter voltage values. With very high voltage batteries, these values may be approached or even exceeded thereby raising the probability of transistor damage. Thus, to effectively utilize semiconductors in a battery cell scanning and monitoring circuit the above problems must be solved preferably in an economical, practical manner.

BRIEF SUMMARY OF THE INVENTION

The present invention comprises a transistor switching arrangement in which serially connected batteries are statically scanned to read individual cell voltages, and high voltage batteries scanned without damage to the transistors. This is accomplished by connecting a parallel transistor-diode combination to each common connection between the cells, and between the common connections and alternate reference voltage sources. A single voltage indicating device is commonly connected between the cathodes of the diodes whose anodes are connected respectively on each side of each of the cells. The transistors are maintained in a normally conductive state by associated logic circuits, for example. Scanning of the cells is accomplished by selectively turning off the transistors connected on each side of each cell. Current then flows through the two diodes connected on each side of the selected cell and through the voltage indicating device which reads the voltage existing on the selected cell. The diodes connected to the conducting transistors limit the path of meter current flow to the cell being read so that the cell is statically isolated from the remaining cells, i.e., isolated without the use of mechanical relays or other types of mechanical switching devices.

Changing the reference voltage level for protecting the transistors is accomplished by first connecting the emitters of the transistors connected to the higher voltage end of the battery directly to a point on the battery providing an emitter potential which assures a minimum derated voltage level for the transistors and for the current blocking function when their base voltages are removed. An additional transistor and diode are then serially connected between the first reference voltage source and the reference potential point on the battery. To monitor the lower voltage portion of the battery, the additional transistor or reference level switch is turned on, the diode functioning to block current drain on the battery. To monitor the high voltage portion of the battery, the reference level switch is turned off thereby permitting a higher emitter potential on the transistors connected to the high volage portion and a reduced collector to emitter voltage differential. The reference level switch allows further use of identical parts with both the lower and higher voltage portions of the battery in a manner to be fully explained hereinafter.

THE DRAWINGS

The objects and advantages of the invention will be best understood from consideration of the following detailed description taken in connection with the accompanying drawings in which.

PREFERRED EMBODIMENTS

Figure 1:
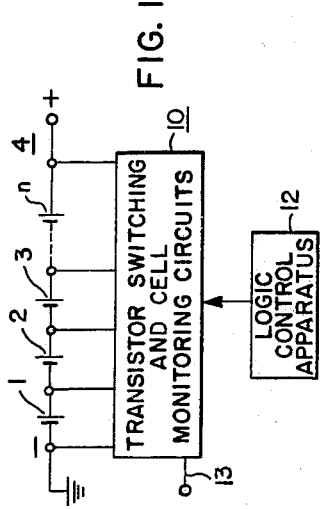
FIGURE 1 is a block diagram of a system using the principles of the present invention.

Specifically, there is shown in FIG. 1 an arrangement for statically scanning a plurality of serially connected battery cells designated 1, 2, 3 . . . $n$ of a battery 4 by a transistor switching and cell monitoring circuit arrangement generally designated 10. The circuit arrangement 10 is controlled, in a manner to be explained, by a circuit selector device, for example, a sequencing device forming part of associated logic circuits and apparatus generally designated 12 in FIG. 1 though the invention is not limited thereto. The battery 4 may comprise any number of cells as indicated by the last cell designation $n$.

Figure 2:
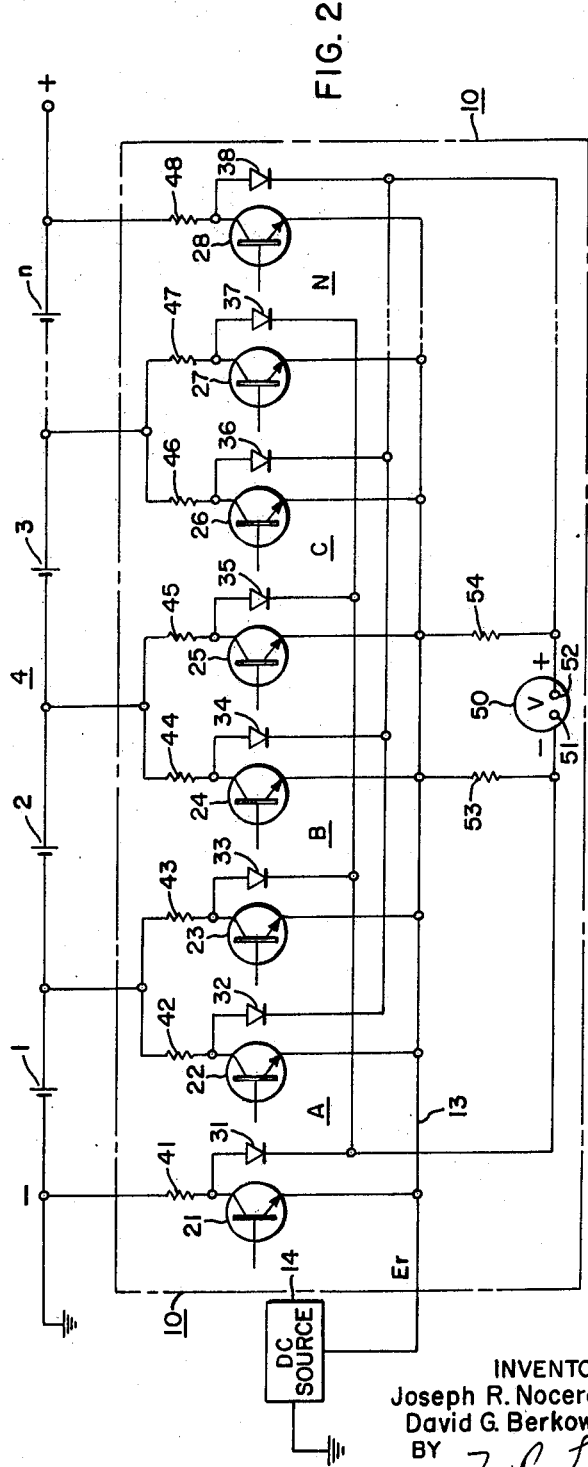
FIG. 2 is a schematic circuit diagram showing a transistor switching circuit constructed in accordance with the principles of the invention.

FIG. 2 shows the switching-monitoring circuit arrangement 10 in detail. The arrangement comprises a transistor switching and diode circuit connected on each side of each of the battery cells 1 to $n$, and between the battery cells and a reference voltage line 13 leading to a low, direct current voltage source 14 connected to ground.

Thus, each cell has an associated pair of transistor-diode circuits, namely, a transistor-diode circuit connected to its negative terminal, and a transistor-diode circuit connected to its positive terminal as shown. The transistors are designated 21 through 28, and the diodes are designated 31 through 38. The transistors 21 and 22 form a circuit pair designated A connected across its associated cell 1. Similarly, the transistors 23 and 24 form a circuit pair designated B for the cell 2, and so on up to the cell $n$ with transistor circuit pair N connected thereacross.

The transistors 21 to 28 are connected to their respective battery cell terminals through respective collector resistors 41 through 48 as shown. The emitters of the transistors are shown commonly connected across each cell to the reference voltage source 14 through the common line 13.

The anodes of the diodes 31 to 38 are respectively connected to the collectors of the transistors 21 to 28 while the cathodes of the diodes 31, 33, 35 and 37 are commonly connected to the left terminal (negative) 51 of a suitable voltage indicating device 50, for example, a voltmeter. The cathodes of the diodes 32, 34, 36 and 38 are connected to the right (positive) terminal 52 of the voltage indicating device. In this manner, the voltage indicating device 50 is permanently connected across the battery cells through the adjacent diodes and emitter resistors (i.e., the transistor-diode circuit pairs A to N) connected on each side of each of the cells as shown.

The diodes 31 to 38 are further connected to the common reference line 13 through meter isolating resistors 53 and 54.

As suggested above, the number of batteries shown in FIGS. 1 and 2 (four) is given by way of example only. Similarly, the number of corresponding transistor-diode circuits (eight) is given by way of example. Any number of battery cells may be monitored by a corresponding number of transistor-diode circuit pairs in a manner presently to be explained.

In operation, the transistors in the circuit arrangement 10 are maintained in a conducting state, except for the pair connected to the battery cell of interest. This is accomplished by applying base voltages to the transistors associated with the cells not of interest, and withholding base voltages to the transistor pair connected across the cell of interest. The emitter resistors 41 to 48 limit the current drain on the battery cells with the transistors being in a conductive state. The diodes 31 to 38 are identical and are forward biased by the voltage on the collectors of the transistors 21 to 28.

The application and withholding the base voltages may be accomplished by the analogy of a simple, manually operated selector switch or actually by sequencing means in the associated logic apparatus 12 representatively shown in FIG. 1.

For a hypothetical case, assume it is desired to measure the voltage on battery cell 2. The base voltages on the transistors 23 and 24 are removed, thereby turning off said transistors while current flow through the remaining transistors continues. With a small negative reference voltage $Er$ provided on the common line 13, current flows from the battery cells through the conducting transistors to the source 14 for return to the cells through the source and cell ground connections. Current flow through associated diodes and the meter resistors 53 and 54 being essentially prohibited by the resistance values of the resistors.

With the transistors 23 and 24 turned off, however, the current flow of cell 2 is directed through associated diodes 33 and 34 and the two meter resistors 53 and 54 to the source 14 and ground, the cathodes of the diodes being connected directly to the resistors. In this manner, the meter 50 is placed directly across cell 2 to read the voltage thereacross, meter current flow for the meter movement being from positive to negative, i.e., from terminal 52 to terminal 51.

The current flow of cell 2 is limited to the diodes 33 and 34 and the meter circuit by the diodes associated with the other conducting transistors. For example, the current flowing down through the diodes 33 and 34 is blocked from flowing in the circuit of cell 1 by the diodes 31 and 32 connected thereto.

In this manner, the cell of interest is statically isolated from the remaining cells without having to physically disconnect the cell from the battery circuit, or without having to isolate the cell with the use of mechanical switching devices such as relays which are limited in reliability and speed of operation. The present invention allows rapid scanning of the battery cells in any order desired with highly reliable semiconductor devices and associated logic control means. With automated control of the transistor base signals, the scanning would be continuous until a sensing circuit (not shown) associated with the logic means 12 senses a cell voltage out of prescribed limits at which time it would operate to momentarily stop the scanning at the defective cell to allow the meter to read and to operate warning device.

Usually, the number of cells employed in battery power source arrangements is substantially greater than the four shown for illustration in FIGS. 1 and 2 so that the voltages involved are high. The minimum derated value of the emitter to collector voltage for the switching transistors limits their use since such a value may be reached or even exceeded at the higher voltage end of the battery. The circuit shown in FIG. 3 eliminates this limitation while simultaneously providing cell isolation and metering in the manner of FIG. 2.

Figure 3:
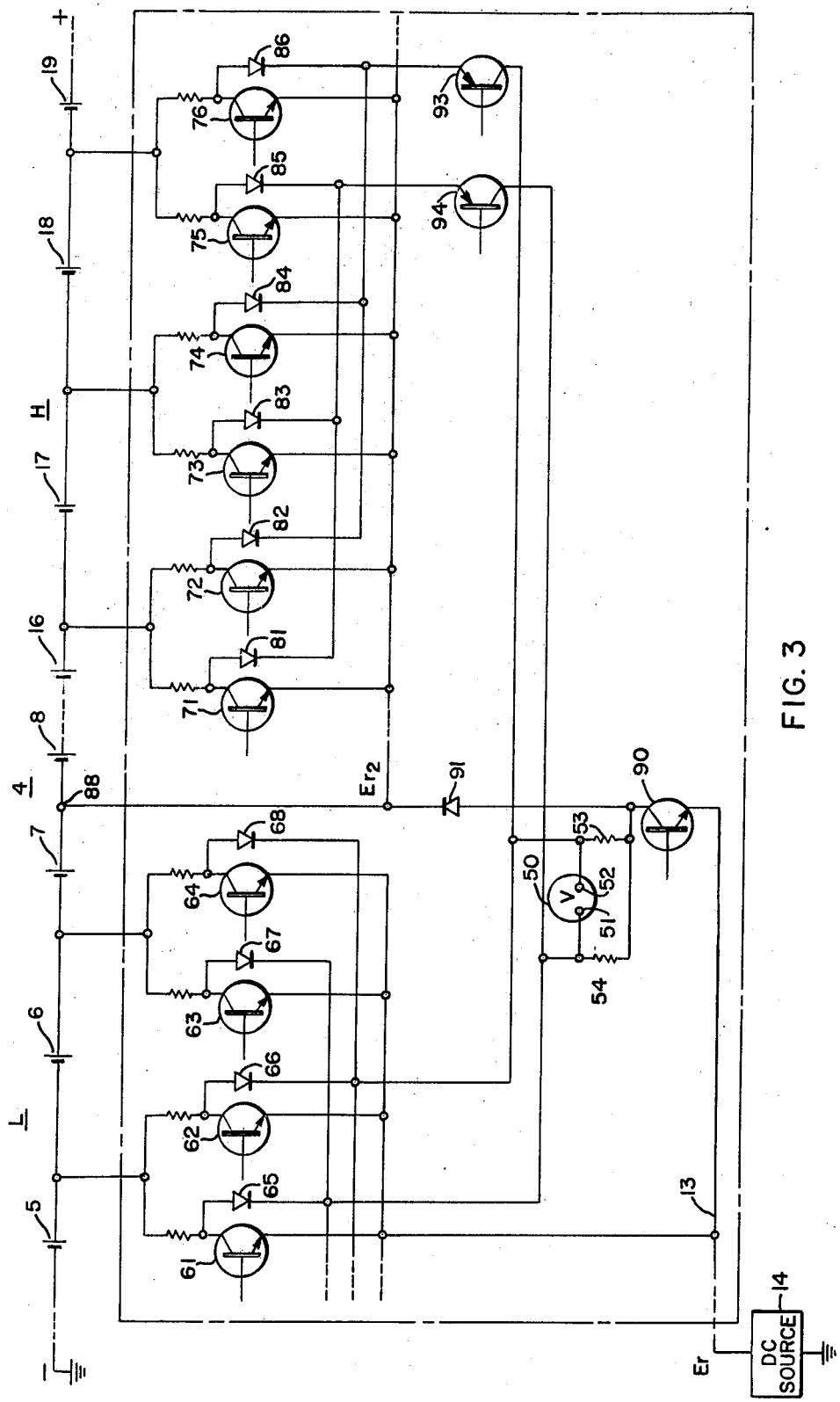
FIG. 3 shows the circuit of FIG. 2 provided with a voltage reference level switch constructed in accordance with the invention.

Specifically, FIG. 3 shows the battery 4 divided essentially into low and high voltage portions L and H respectively.

The low and high voltage cells are statically isolated and monitored by pairs of transistor switching and diode circuits in a manner similar to that described above in connection with FIG. 2. The switching transistors shown connected to the low voltage portion of the battery 4 are designated 61 to 64 while the associated diodes are labelled 65 to 68. In the high voltage portion of the battery, the switching transistors shown are designated 71 to 76 while the associated diodes are designated 81 to 86.

In order to reduce the collector to emitter voltage differential and thereby protect the isolating transistors in the high voltage portion of the battery 4, the voltage on the emitters of the transistors 71 to 76, for example, is raised by commonly connecting the emitters to a tap 88 provided at a location along the serially connected cells (in this instance between cells 7 and 8) instead of to the line 13 and the low voltage direct current source 14. In this manner, a new reference voltage level E$r_2$ is established for the transistors connected to the high voltage cells. The tap 88 does not, however, precisely divide the battery in the high and low voltage portion. The cell 8, and those (not shown) immediately to the right thereof, are monitored in the low voltage portion of the battery since the voltage (E$r_2$) provided at the tap 88 would not support normal on-off operation for said transistors. Thus, cells 5 through 8 and a few more of the cells (not shown) connected serially in line therewith are included in the low portion L of the battery 4 while cells 16 through 19 and a few cells (not shown) connected in line to the left of cell 16 are included in the high voltage portion H of the battery.

The cell 8 and the few (not shown) immediately to the right thereof provide a source of negative bias for the switching transistors in the high voltage portion H of the battery, including the transistors 71 through 76. Thus, these cells afford a minimum voltage source for the first few transistors (not shown) in the high voltage portion of the battery to support normal on-off operation.

The reference voltage for the switching transistors in the low voltage portion L of the battery 4 is the same as that shown in FIG. 2, namely, the potential E$r$ provided by the low voltage direct current source 14.

In accordance with the invention, the low and high voltage portions L and H of the battery are separately monitored by switching or shifting the voltage reference levels E$r$ and E$r_2$. This is accomplished with a single switching transistor 90 connected between the meter 50 and the low reference voltage line 13, and a forward biased diode 91 connected between the transistor 90 and the raised reference voltage tap 88 on the battery.

Between the meter 50 and the diodes 81 to 86 is connected a pair of switching transistors 93 and 94 which commonly connect and disconnect the diodes 81 to 86 to and from the meter in a manner presently to be explained.

In operation, the switching of the cell isolating transistors connected to the high and low voltage portions of the battery is effected by application and removal of base voltages by the logic apparatus 12 as described above in connection with FIG. 2.

When the low voltage cells, 5, 6 and 7 for example, are to be statically monitored, the logic apparatus 12 operates further to apply a base voltage to the transistor 90. The transistor is thereby rendered conductive so that the meter circuit is now connected to the reference voltage (E$r$) line 13. As each cell monitoring transistor pair is switched off by the logic apparatus, the meter 50 is placed across the particular cell by current flow through the diode pair (diodes 66 and 67, for example), and through the meter resistors 53 and 54 respectively to the line 13 through the conducting transistor 90. Thus, the reference voltage for the low voltage transistor switches of battery portion L is the same as the circuit of FIG. 2.

With the monitoring of the lower portion of the battery, and with the diodes associated with the upper portion H of the battery being connected to the meter circuit, the diodes 81 to 86, for example, would be forward biased by the high voltage differential existing between the line 13 and the cells 16 to 19. The diodes would therefore be in a conductive state during monitoring of the low voltage cells thereby placing a current drain on the high voltage cells. Such a current drain is prevented in the circuit of FIG. 3 by rendering the transistors 93 and 94 nonconductive; this may be accomplished by the logic apparatus 12 removing base voltages therefrom when the base voltage is applied to the transistor 90. In this manner, the diodes 81 to 86 are disconnected from the meter circuit and from the reference voltage E$r$.

Current drain on the high voltage portion of the battery 4 is further prevented by the diode 91 when the circuit is monitoring the low voltage portion of the battery.

In order to protect the transistors connected to the high voltage portion H of the battery 4 when the sequencing operation of the logic apparatus 12 operates to remove base voltages therefrom, the logic apparatus functions further to remove the base voltage applied to the transistor 90. The transistor 90 is now rendered nonconductive which opens the circuit between the line 13 and the diode 91 thus shifting the voltage reference level from E$r$ (providing by source 14) to E$r_2$ (providing by the cell 8 and those few cells not shown to the right thereof) for the transistors connected to the higher voltage portion of the battery.

When the base voltage to the transistor 90 is removed, the logic apparatus 12 functions to apply base voltages to the transistors 93 and 94. The two transistors are thereby made conductive so that the diodes associated with the higher voltage cells are now connected to the meter circuit through the conducting transistors 93 and 94. The diodes associated with the lower voltage portion of the battery remain connected to the meter 50, but the meter is now disconnected from the reference line 13 by the nonconducting transistor 90, and connected to the reference voltage tap 88 on the battery by the diode 91.

The transistor 90 provides further for the use of identical components in both portions L and H of the battery 4. If the meter 50 were to remain connected to the same reference voltage source (i.e., source 14) when monitoring the high voltage portion of the battery, the drain on the battery would be greater for metering the higher voltage portion than for the lower voltage portion because of the voltage divider effect created by the collector resistors of the cell of interest and the meter resistors 53 and 54. This would cause a metering error or inconsistency between the two battery portions L and H. With the transistor 90 rendered nonconductive, the voltage divider across the battery is transferred to the high voltage portion through the diode 91. Thus, current flow through the diodes of a high voltage cell being metered, cell 18 for example, is through the diodes 84 and 85, through the transistors 93 and 94, through meter resistors 53 and 54, and through the diode 91 to the tap 88.

From the foregoing description it should now be apparent that a new, useful and unobvious battery cell monitoring circuit has been disclosed in which a minimum of inexpensive components are employed and arranged to statically isolate each cell for metering purposes. The monitoring circuit comprises a transistor and a forward biased diode connected to each side of the cell, and a voltage indicating device permanently connected between diodes and a reference voltage source. By removing the base voltage to the transistors associated with the cell to be metered, current flow is limited to the associated two diodes thereby placing the indicating device across that cell.

To provide uniformity in components used, and to protect the transistors connected to the higher voltage portions of a battery from over voltage stresses, the emitters of the transistors are connected directly to a point on the battery to provide a second, raised reference potential, and a single transistor and diode connected between the point and the first reference source for switching the reference potentials when it is desired to monitor different portions of the battery with consistent readings.

Though the invention has been described with a certain degree of particularity, changes may be made therein without departing from the spirit and scope of the invention.

What is claimed is:

1. A static circuit for monitoring the voltages on a plurality of serially connected battery cells each having a pair of terminals, the circuit comprising
- a pair of like polarity transistors serially connected by their emitters and collectors across each of the cells, each of said pair of transistors having its collector connected to a terminal of the cell and its emitter connected to a common source of voltage,
- a diode connected between the common source of voltage and the collector of each transistor so that a pair of diodes is connected across each of the cells,
- a voltage indicating means permanently connected between like polarity terminals of the diodes forming the diode pairs respectively connected across each of the cells, and
- means for sequentially applying and removing base voltages to the transistor pairs.

2. The circuit described in claim 1 in which the means for sequentially applying and removing the base voltage includes logic apparatus.

3. The circuit described in claim 1 in which the like polarity terminals of the diodes and the voltage indicating means are connected to the common source of voltage through a pair of parallel connected resistors.

4. A circuit for monitoring the voltages on a plurality of serially connected cells of a battery, adjacent cells having a common electrical connection therebetween, the circuit comprising
- a pair of transistor switching circuits connected across each cell, the collectors of the transistors of the switching circuits being respectfully connected to the common connections between the cells,
- a diode connected to the collector of each of the transistors,
- a reference level switch comprising a diode and transistor serially connected between a common source of voltage and the battery cells at a common connection between two of the cells so that the cells are effectively divided into lower and higher voltage portions,
- a voltage indicating means permanently connected between the diodes respectively connected to the transistor switching circuits connected across each of the cells,
- resistance means connecting the transistor switching circuits and voltage indicating means to the collector of the transistor of the reference level switch,
- the emitters of the transistors of the switching circuits associated with the higher voltage portion of the battery being connected to the common connection between the two cells,
- the emitters of the transistors associated with the lower voltage portion of the battery being connected to the common source of voltage.

5. The circuit recited in claim 4 in which the diodes connected to the transistor switching circuits in the higher voltage portion of the battery are connected to the voltage indicating means through two additional transistors.

References Cited

UNITED STATES PATENTS

| | | | |
|---|---|---|---|
| 2,225,051 | 12/1940 | Heyer | 324—29.5 |
| 2,621,231 | 12/1952 | Medlar et al. | 324—29.5 |
| 3,366,943 | 1/1968 | Hart | 324—29.5 X |

RUDOLPH V. ROLINEC, Primary Examiner

C. F. ROBERTS, Assistant Examiner

U.S. Cl. X.R.

324—157